(12) United States Patent
Slone

(10) Patent No.: US 11,707,801 B2
(45) Date of Patent: Jul. 25, 2023

(54) ALIGNMENT OF LASER FOR GEAR INSPECTION

(71) Applicant: SLONE GEAR INTERNATIONAL, INC., Tipp City, OH (US)

(72) Inventor: Brian W. Slone, Dayton, OH (US)

(73) Assignee: SLONE GEAR INTERNATIONAL, INC., Tipp City, OH (US)

(*) Notice: Subject to any disclaimer, the term of this patent is extended or adjusted under 35 U.S.C. 154(b) by 1005 days.

(21) Appl. No.: 16/549,370

(22) Filed: Aug. 23, 2019

(65) Prior Publication Data

US 2020/0061739 A1 Feb. 27, 2020

Related U.S. Application Data

(60) Provisional application No. 62/721,752, filed on Aug. 23, 2018.

(51) Int. Cl.
*B23K 26/035* (2014.01)
*G01B 11/24* (2006.01)
*B23K 26/042* (2014.01)

(52) U.S. Cl.
CPC ........ *B23K 26/035* (2015.10); *G01B 11/2416* (2013.01); *B23K 26/042* (2015.10)

(58) Field of Classification Search
CPC ............................ B23K 26/035; B23K 26/042; G01B 11/2416; G01B 5/0004
USPC ..................................................... 219/121.78
See application file for complete search history.

(56) References Cited

U.S. PATENT DOCUMENTS

| | | | | |
|---|---|---|---|---|
| 4,547,674 A | * | 10/1985 | Pryor | G01B 11/2416 250/559.38 |
| 5,287,293 A | * | 2/1994 | Chen | G06T 7/0006 382/152 |
| 8,333,766 B2 | * | 12/2012 | Edelhauser | A61B 17/62 606/56 |
| 9,044,271 B2 | * | 6/2015 | Edelhauser | A61B 17/62 |
| 2009/0103112 A1 | * | 4/2009 | Nygaard | G01B 11/245 356/638 |
| 2012/0162076 A1 | * | 6/2012 | Obermeyer | G01D 5/285 345/161 |

\* cited by examiner

*Primary Examiner* — Dana Ross
*Assistant Examiner* — Joseph W Iskra
(74) *Attorney, Agent, or Firm* — Thomas E. Lees, LLC

(57) ABSTRACT

A process for aligning a laser in a gear inspection system is disclosed. The method comprises fixing a gear for inspection within a gear inspection system and emitting a first signal from a laser to a point of interest of the gear. A reflection of the first signal is received as the first signal reflects off the point of interest of the gear. Based on the reflection of the first signal, an orientation of the laser is adjusted. Subsequently, a second signal is emitted from the laser to the point of interest of the gear, and a reflection of the second signal is received as the second signal reflects off the point of interest of the gear. Values corresponding to the orientation of the laser are stored based on the reflection of the second signal.

7 Claims, 6 Drawing Sheets

ALIGNMENT OF LASER FOR GEAR INSPECTION

CROSS REFERENCE TO RELATED APPLICATIONS

This application claims the benefit of U.S. Provisional Patent Application Ser. No. 62/721,752, filed Aug. 23, 2018, entitled "ALIGNMENT OF LASER FOR GEAR INSPECTION", the disclosure of which is hereby incorporated by reference.

BACKGROUND

Various aspects of the present invention relate generally to gear inspection systems using a laser and more specifically to aligning a laser with respect to a gear for laser inspection of the gear.

A gear is created using a grinding wheel that removes pieces of a blank. When everything runs smoothly, the gears that are created are in a good working condition and uniform. However, if the grinding wheel breaks down, then there may be some variation in the gears from an optimal gear. These suboptimal gears may break down and cause damage in which ever devices they are in. As such, gears are inspected to determine if there is any variation from the optimal gear. If the gear is optimal, then everything is fine. However, if there is a variation, then the gear is scrapped, and the grinding wheel may be redressed or replaced.

BRIEF SUMMARY

According to aspects of the present disclosure, a process for aligning a laser in a gear inspection system is disclosed. The method comprises fixing a gear for inspection within a gear inspection system and emitting a first signal from a laser to a point of interest of the gear. A reflection of the first signal is received as the first signal reflects off the point of interest of the gear. Based on the reflection of the first signal, an orientation of the laser is adjusted. Subsequently, a second signal is emitted from the laser to the point of interest of the gear, and a reflection of the second signal is received as the second signal reflects off the point of interest of the gear. Values corresponding to the orientation of the laser are stored based on the reflection of the second signal.

According to further aspects of the present disclosure, a gear inspection system comprises a spindle with a portion to receive a gear for inspection and a fixing mechanism that fixes the gear to the spindle. Further, the gear inspection system comprises a laser that emits a signal at a point of interest of the gear to create a reflected signal and a receiver that receives the reflected signal. A user interface accepts inputs from a user to adjust an orientation of the laser, where the orientation adjustments include adjustments in a horizontal direction, a vertical direction, a depth direction, roll, pitch, yaw, or combinations thereof. A processor transforms the inputs from the user interface into adjustment instructions for a six-point adjustment system coupled to the laser and the processor, and an adjustment in one of the orientations of the six-point adjustment system is independent of an adjustment in the other orientations.

DETAILED DESCRIPTION

When using a laser to inspect a gear to determine breakdown of a grinding wheel used to shape the gears, the laser should be aligned properly to emit a signal at a point of interest on the gear. According to various embodiments of the present disclosure, the laser is aligned with a six-point alignment system manually, automatically, or both. Once the laser is aligned, orientation settings for the six-point adjustment system are stored in a memory, so when a new gear of the same type of gear is placed on the gear inspection system, the six-point adjustment system may be placed in the same orientation as when the original gear was on the gear inspection system.

Figure 1:
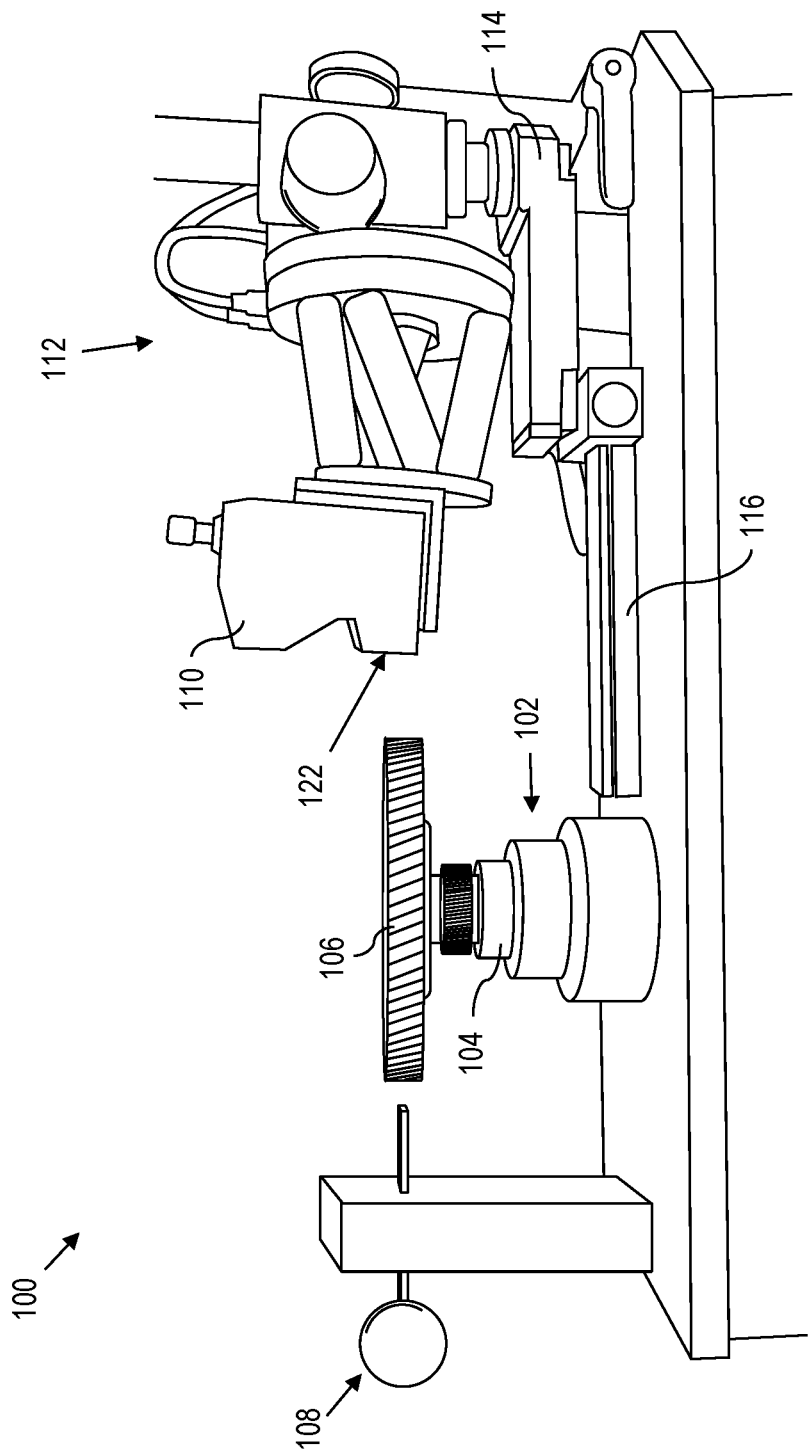
FIG. 1 is a block diagram illustrating a system for inspecting a gear with a laser, according to various aspects of the present disclosure.

Turning now to FIG. 1, a block diagram of a laser-based gear inspection system 100 is shown. The gear inspection system 100 includes a spindle 102 that includes a portion 104 to receive an associated gear 106 for inspection. The spindle 102 is free to rotate the gear 106 during an inspection process.

Further, various embodiments of the gear inspection system 100 include a fixing mechanism 108 that prevents the gear 106 for inspection from rotating while the gear inspection system 100 is being set up for the inspection process. For example, a ball plunger may be used as the fixing mechanism 108 such that a plunger portion is disposed in a tooth gap of the gear 106 for inspection.

In some embodiments, the fixing mechanism 108 is retracted after the gear 106 is positioned. In such embodiments, the gear 106 may be rotated during testing. For example, the gear may be continuously rotated during the test or rotated, then analyzed, then moved again for another analysis and so on.

The gear inspection system 100 further includes a laser 110 coupled to a six-point adjustment system 112 on a mount 114. In some embodiments, the mount 114 is on a slide 116 so the mount 114, six-point adjustment system 112, and the laser 110 may be moved closer or further (i.e., a depth direction relative to the gear 106, which is left/right in FIG. 1). Thus, the slide 116 allows for a coarse adjustment in the depth direction. The laser 110 may be a single-point laser or a multipoint laser.

In order to make fine-tuned adjustments, the six-point adjustment system 112 can move and change orientation of the laser 110. As used herein, an orientation and an orientation adjustment not only include a direction but also include a location. Thus, an orientation adjustment may be in roll, pitch, yaw as normal, but also includes horizontal, vertical, and depth adjustments. The six-point adjustment system may be a Gough-Stewart platform (i.e., a hexapod) that may be electronically activated, mechanically activated, or both.

Figure 2:
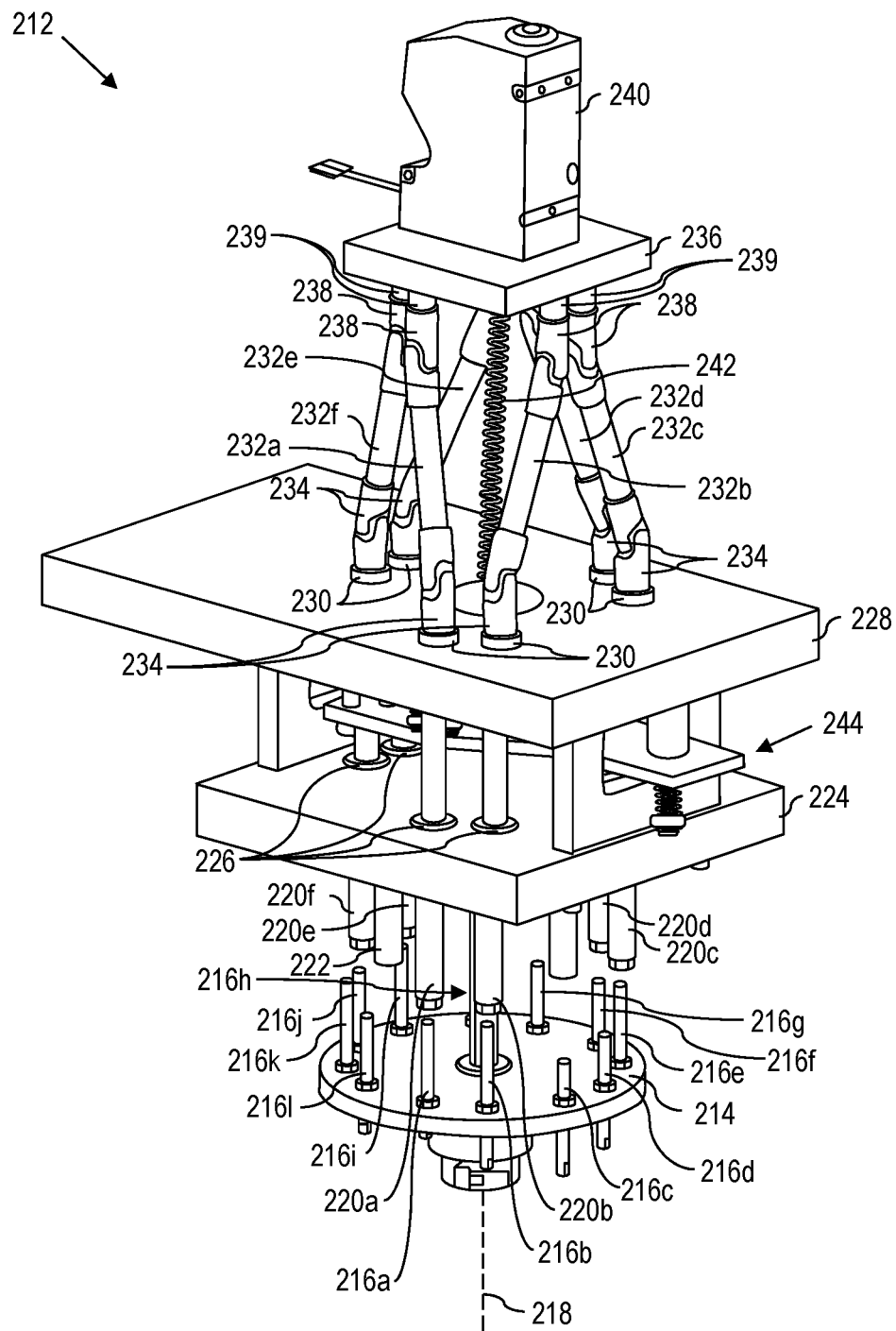
FIG. 2 is a diagram showing a mechanical hexapod with six degrees of movement, according to various aspects of the present disclosure.

For example, referring to FIG. 2, the mechanically activated hexapod 212 includes a positioner platform 214 with twelve positioners 216a-1 (although any number of positioners may be used). The positioner platform 214 may be rotated around an axis 218 and may be keyed to ensure that six of the positioners 216 align with six independent legs 220a-f. Each positioner 216 is individually adjustable in the vertical (i.e., axial) direction so each can have a different vertical distance (i.e., height) from the positioner platform 214 to an end of the positioner 216. Thus, a user can manually adjust the heights of each of the positioners and lock them into place.

As there are twelve positioners shown 216 and the positioner platform rotates around the axis, the positioners can provide two independent positions for contact with the legs 220. For example, in a first rotation of the positioner platform, positioners 216a, b, e, f, i, and j make contact with legs 220a-f, respectively. In a second rotation, positioners 216 c, d, g, h, k, and l make contact with legs 220a-f, respectively. Thus, the first position is completely independent of the second position. If eighteen positioners are included, then three independent positions may be created, and so on.

Further, if there can be overlap between rotations, then there may be twelve dependent positions. For example, in a first rotation, positioners 216a, b, e, f, i, and j make contact with legs 220a-f, respectively. In a second rotation, positioners 216b, c, f, g j, and k make contact with legs 220a-f, respectively.

Moreover, the positioner platform 214 moves vertically (i.e., axially) in order to make contact between the positioners 216 and the legs 220. The movement may be performed manually by a user, through a linear actuator, etc., or combinations thereof. Further, stoppages 222a-b extend from a first stage 224 to ensure that the positioner platform 214 and positioners 216 do not push the legs 220 too far. Thus, in several embodiments, the length of the stoppage 222 is greater than the length of the positioners 216 above the positioner platform 214.

The legs 220 extend through the first stage 224 via linear bearings 226 and through a second stage 228 via linear bearings 230. The each of the legs 220 couples to an associated shaft 232 through corresponding universal joints 234. Moreover, each of the shafts 232 couple to extensions of a laser platform 236 through more universal joints 238. As there are six independent legs 220, corresponding to six independent shafts 232, corresponding to six independent extensions 239, the laser platform 236 has six degrees of adjustability for positioning a laser 240. Further, the positioner platform may be used for a coarse adjustment of all legs, and the positioners may be used as fine tuning for the legs.

In use, the user can manually set the lengths of the positioners as discussed above to create two or more overall positions for the laser platform 236. Then, by moving the positioner platform 214, the laser platform 236 may be placed in one of those positions. A spring member 242 contracts such that the laser platform 236 is pushed toward the positioner platform 214 and a bias member. In some embodiments, to change the contraction strength of the spring, the spring must be changed out for another spring. In other embodiments, an adjustment screw or bias member may be used to change the contraction strength of the spring.

An electrically activated hexapod uses servos to adjust the six degrees of adjustability and does not use the legs, positioners, and positioner platform described above.

Referring back to FIG. 1, the laser 110 emits a signal at a point of interest on the gear 106. When the signal hits the point of interest, a reflection of the signal is created, and a receiver 122 receives the reflected signal. In some embodiments, portions of the reflected signal that lack integrity may be masked out to remove some of the reflection that lacks integrity. However, in some cases, the masked version of the reflected signal may still lack integrity, or the system may not include a masking feature. As such, the reflection of the signal is then processed by a processor (see FIG. 5) to create a data plot of the reflection, which is representative of a structure of the gear 106 under inspection. If the reflection lacks integrity (e.g., if the reflection is missing any points, if the reflection is unstable, if the signal lacks strength, etc.), then the six-point adjustment system 112 can be adjusted to direct the signal to the point of interest from a different angle by adjusting the laser in a horizontal direction, a vertical direction, a depth direction, roll, pitch, yaw, or combinations thereof.

For example, in some embodiments, the gear inspection system 100 transforms the reflected signal into a data plot for display on an associated display (see FIG. 6), which also displays a user interface that accepts inputs from a user to manually adjust an orientation of the laser 110. The accepted inputs may be an absolute orientation or may be a relative orientation (i.e., a change from the previous orientation).

The processor then transforms the inputs from the user interface into adjustment instructions for the six-point adjustment system. Thus, an adjustment in one of the orientations of the six-point adjustment system is independent of an adjustment in the other orientations. For example, an adjustment in yaw does not affect a horizontal position of the laser 110.

In numerous embodiments, the adjustments to the six-point adjustment system 112 are performed automatically. For example, the processor determines whether there is an instability in the reflection of the signal (e.g., reflected points are jumping around or scattered). If there is an instability, the processor determines which side of the point of interest is creating the instability and determines a horizontal adjustment to adjust the laser 110 away from the side of the point of interest that is creating the instability in the reflection. The horizontal adjustment is then sent to the six-point adjustment system 112, and the six-point adjustment system 112 then adjusts the orientation of the laser 110. Then, if a yaw adjustment is required to point the laser 110 back to the point of interest, then the processor determines a yaw adjustment in a direction toward the point of interest to correspond with the horizontal adjustment of the laser and sends the yaw adjustment to the six-point adjustment system 112 to adjust the laser 110 to point back at the point of interest.

As another example of automatic adjustment, the processor (see FIG. 5) determines a signal strength of the reflection of the signal and then determines a roll adjustment based on the determined signal strength. For example, a weaker signal strength means the laser 110 should be adjusted in a direction of a helix of the gear. Then, the roll adjustment is sent to the six-point adjustment system 112 to adjust the laser 110 to strengthen the signal.

A further example includes having the processor determine whether there are any missing points in the reflection of the signal. Such missing points are indicative of a shadow. As such, the processor determines a pitch adjustment to give the laser 110 a line of sight to the area of interest. Then, the pitch adjustment is sent to the six-point adjustment system 112 to adjust the laser 110 to remove shadows.

Other automatic adjustments may be generated and sent to the six-point adjustment system 112. Further, the automatic adjustments may be iterated through to find an optimal orientation of the laser 110.

Once an optimal orientation (i.e., the signal hits the point of interest orthogonally) is found (automatically, manually, or both), then the orientation instructions are stored in memory (see FIG. 6) for later retrieval to find the optimal point again when a similar gear is placed in the gear inspection system 100 for inspection. The orientation instructions stored may be relative orientation instructions or a final set of absolute orientation instructions.

The gear inspection system 100 of FIG. 1 has benefits over existing solutions, because only one laser is required to find an optimal orientation. However, in existing solutions, up to five lasers are required. Further, the six-point adjustment system 112 allows for six different adjustments that are independent of each other. In existing systems, a manual adjustment is required and exists in several different stages, where an adjustment of one stage may affect a different stage.

Figure 3:
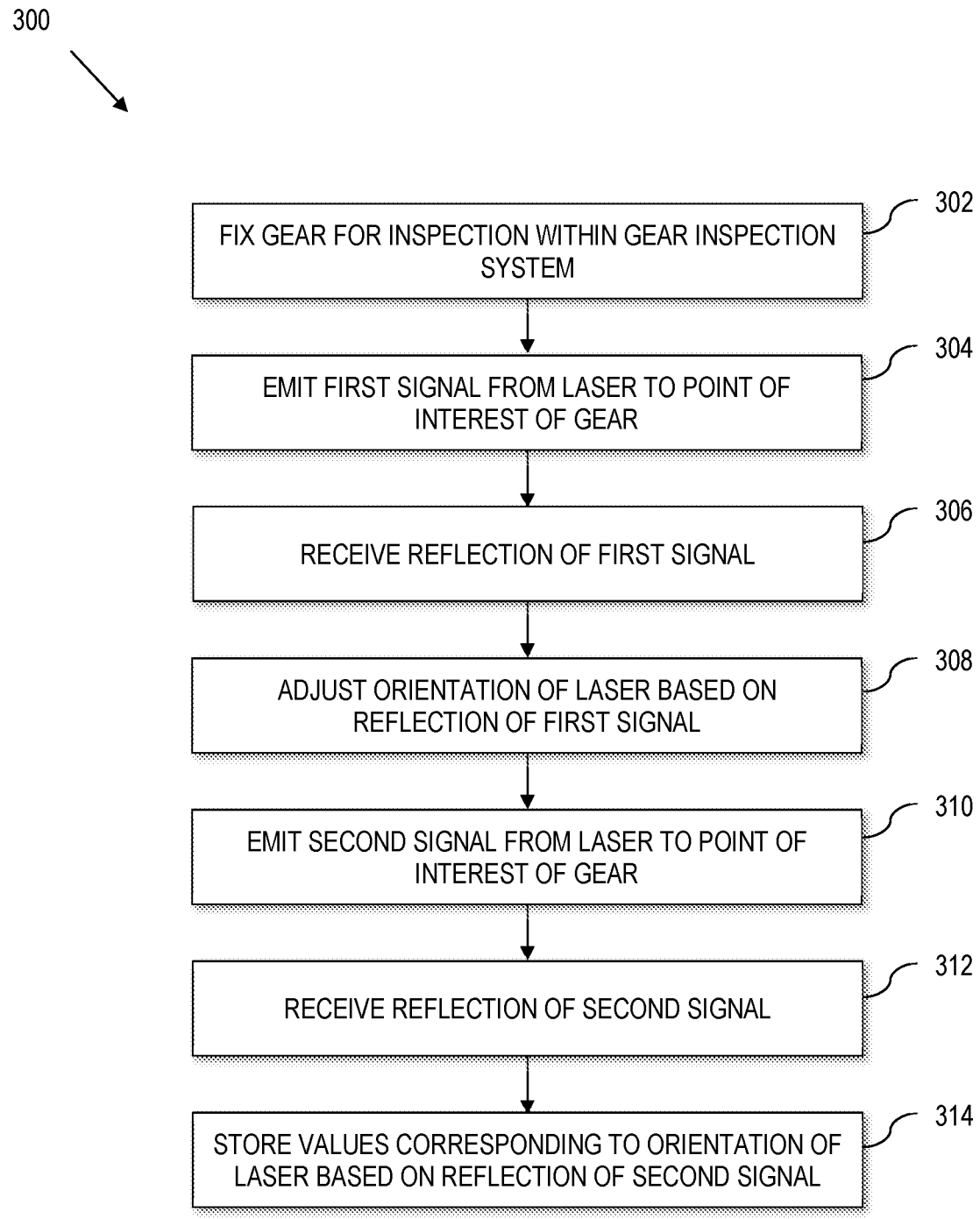
FIG. 3 is a flow chart illustrating a process for aligning a laser for gear inspection, according to various aspects of the present disclosure.

Turning now to FIG. 3, a flow chart of a process 300 for aligning a laser in a gear inspection system (e.g., the gear inspection system 100 of FIG. 1). At 302, a gear is fixed for inspecting within the gear inspection system. For example, the gear may be placed on a spindle and then fixed with a ball plunger to prevent the gear from rotating during alignment. At 304, a first signal is emitted from a laser to a point of interest on the gear. Optimally, the signal will be normal to the point of interest. At 306, a reflection of the first signal is received.

At 308, an orientation of the laser is adjusted based on the reflection. This may be performed manually, automatically, or both. For example, the reflected signal may be displayed as a plot (e.g., see FIGS. 4-5) for a user to determine how the laser should be adjusted. Then, the user enters orientation adjustments in a user interface. The orientation adjustments are for adjusting the laser in a horizontal direction, a vertical direction, a depth direction, roll, pitch, yaw, or combinations thereof. These orientation adjustments are then transformed into adjustment instructions and sent to a six-point adjustment system. Thus, the orientation adjustments are independent of each other.

In numerous embodiments, the adjustments to the six-point adjustment system are performed automatically. For example, if there is an instability in the reflection of the first signal (e.g., reflected points are scattered), a determination is made for which side of the point of interest is creating the instability and determines a horizontal adjustment to adjust the laser away from the side of the point of interest that is creating the instability in the reflection. The horizontal adjustment is then sent to the six-point adjustment system, and the six-point adjustment system then adjusts the orientation of the laser. Then, if a yaw adjustment is required to point the laser back to the point of interest, then the processor determines a yaw adjustment in a direction toward the point of interest to correspond with the horizontal adjustment of the laser and sends the yaw adjustment to the six-point adjustment system to adjust the laser to point back at the point of interest. In various embodiments, the horizontal and yaw adjustments are sent to the six-point adjustment system simultaneously.

As another example of automatic adjustment, a signal strength of the reflection of the signal is determined and a roll adjustment is generated based on the determined signal strength. For example, a weaker signal strength means the laser should be adjusted in a direction of a helix of the gear. Then, the roll adjustment is sent to the six-point adjustment system to adjust the laser to strengthen the signal.

A further example includes determining whether there are any missing points in the reflection of the signal. Such missing points are indicative of a shadow. As such, a pitch adjustment to give the laser a line of sight to the area of interest is determined. Then, the pitch adjustment is sent to the six-point adjustment system to adjust the laser to remove shadows.

Other automatic adjustments may be generated and sent to the six-point adjustment system.

At 310, a second signal is emitted from the laser to the point of interest, and at 312, a reflection of the second signal is received. If further adjusting is required, then adjustments similar to the orientation adjustments mentioned above may be performed and more signals and reflections are used serially to iterate through different adjustments (manual, automatic, or both). However, once an optimal orientation is found, values corresponding to the orientation of the laser based on the reflection of the second signal are stored in memory at 314.

The stored values may be the received inputs from the user, adjustment instructions, absolute, relative, or combinations thereof. When a similar new gear is placed on the gear inspection system, then the values may be retrieved for an optimal orientation. However, in some cases, further fine tuning may be required for each individual gear.

Figure 4:
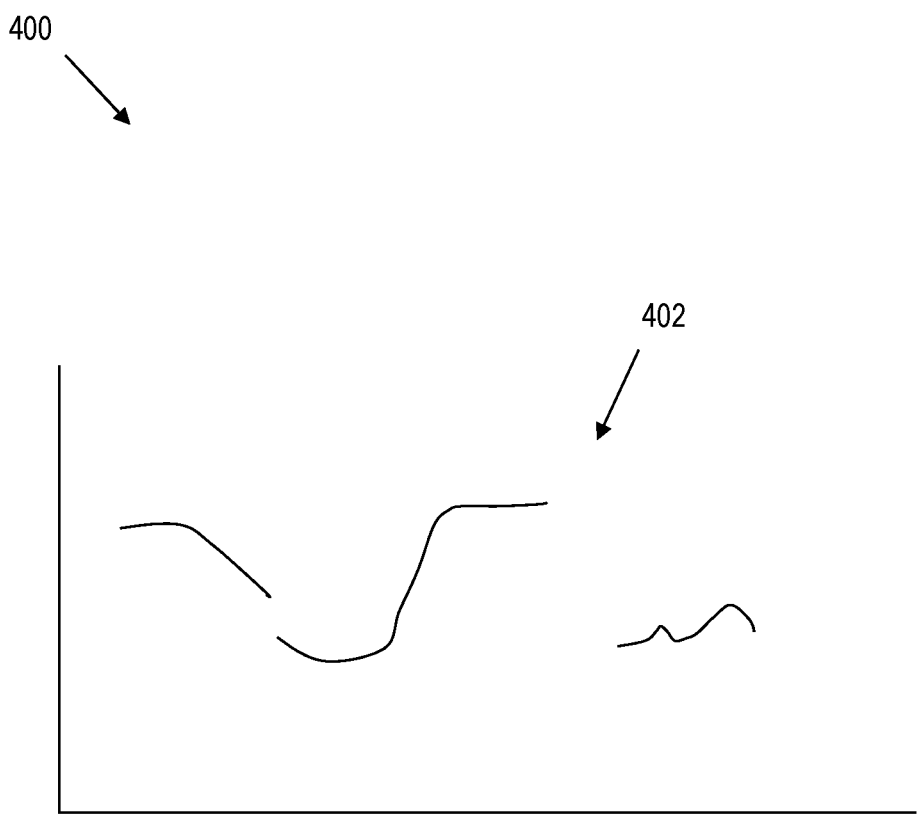
FIG. 4 is a plot of a reflected signal illustrating a received signal with missing data points, according to various aspects of the present disclosure.

FIG. 4 is a graph 400 of a plot 402 of a reflected signal illustrating a received signal with missing data points. As noted above, missing data points may be indicative of a need for a pitch adjustment. As such, if missing data points are detected, then the laser may be adjusted to remove a shadow and receive the reflection that corresponds to the missing data points.

Figure 5:
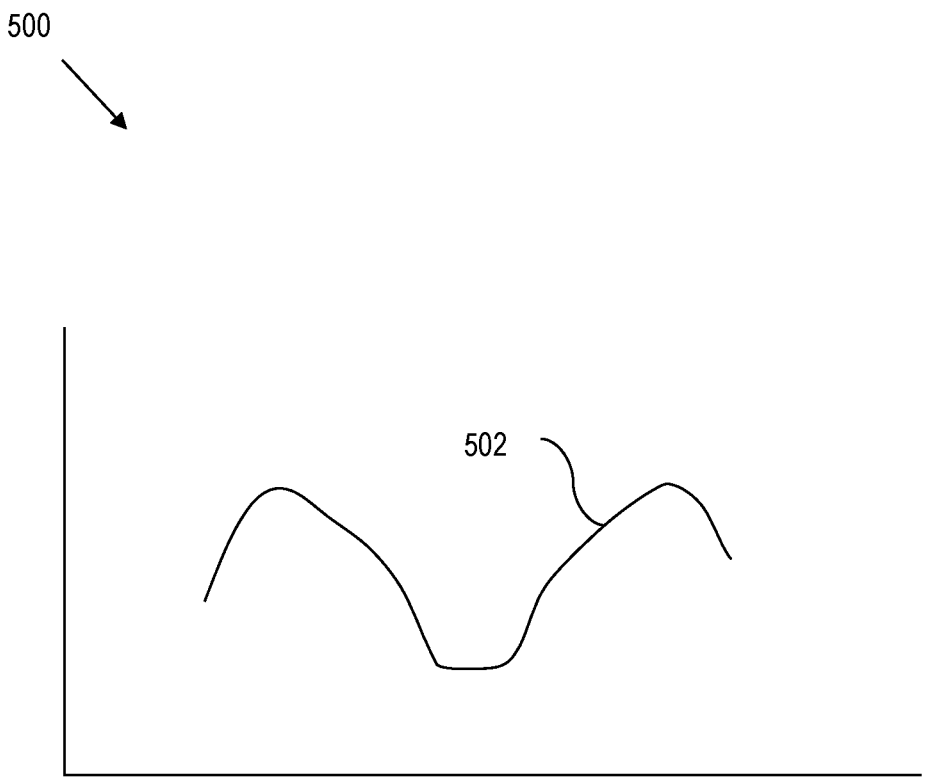
FIG. 5 is a plot of a reflected signal illustrating a received signal with no missing points, because an adjustment in a laser, according to various aspects of the present disclosure.

FIG. 5 is a graph 500 of a plot 502 of the reflected signal of FIG. 4 after the pitch adjustment has been performed. Thus, the data plot 502 is continuous.

Figure 6:
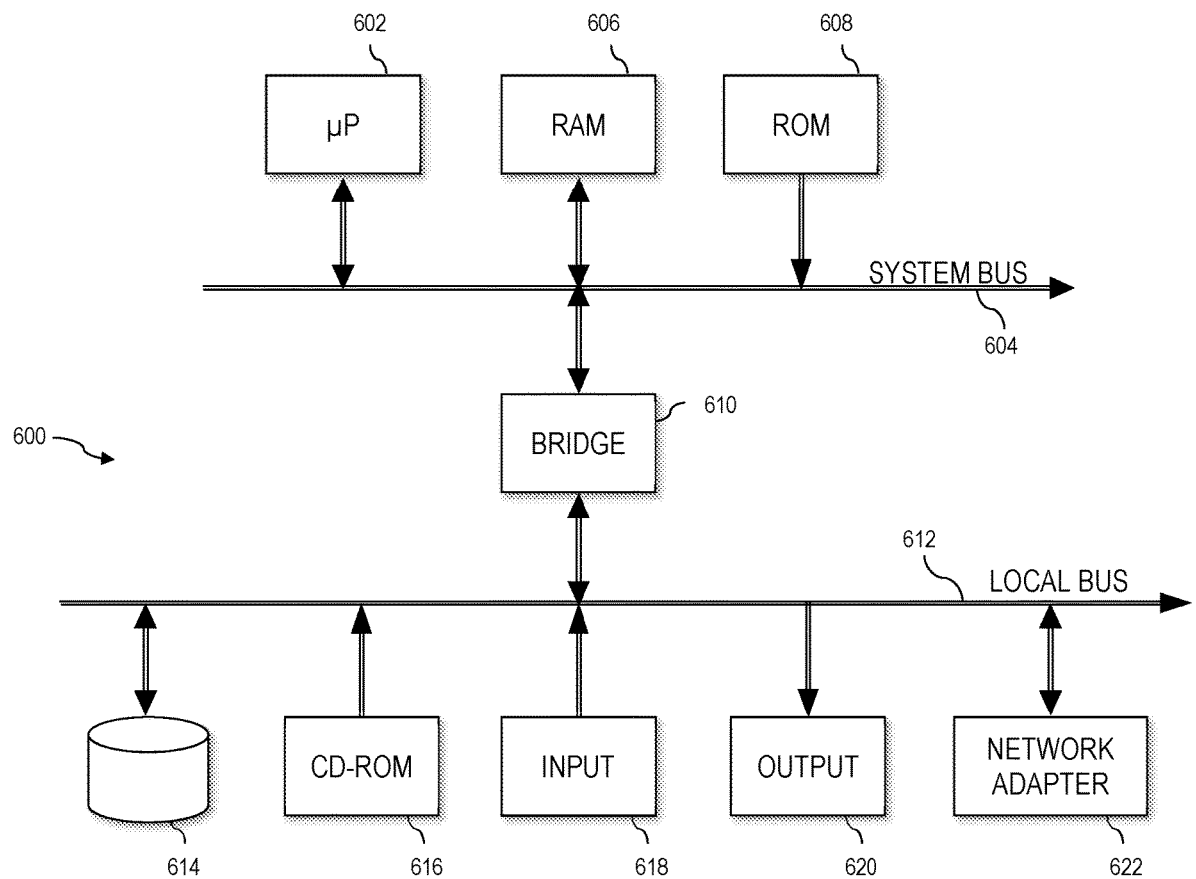
FIG. 6 is block diagram of a general computer system that may implement processes for aligning a laser for gear inspection, according to various aspects of the present disclosure.

Referring to FIG. 6, a block diagram of a hardware data processing system is depicted in accordance with the present disclosure. Data processing system 600 may comprise a symmetric multiprocessor (SMP) system or other configuration including a plurality of processors 602 connected to system bus 604. Alternatively, a single processor 602 may be employed. Also connected to the system bus 604 is local memory, e.g., RAM 606 and/or ROM 608. An I/O bus bridge 610 interfaces the system bus 604 to an I/O bus 612. The I/O bus 612 is utilized to support one or more buses and corresponding devices, such as storage 614, removable media storage 616, input devices 618, output devices 620, network adapters 622, other devices, combinations thereof, etc. For instance, a network adapter 622 can be used to enable the data processing system 600 to communicate with other data processing systems or remote printers or storage devices through intervening private or public networks.

The memory 606, 608, storage 614, removable media storage 616, or combinations thereof can be used to store program code that is executed by the processor(s) 602 to implement any aspect of the present disclosure described and illustrated in the preceding figures.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using a Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A gear inspection system comprising:
    a spindle with a portion to receive a gear for inspection;
    a fixing mechanism that fixes the gear to the spindle;
    a laser that emits a signal at a point of interest of the gear to create a reflected signal;
    a receiver that receives the reflected signal;
    a processor;
    a six-point adjustment system coupled to the laser and the processor, wherein the six-point adjustment system includes six independent shafts driven by servos; and
    a user interface that accepts inputs from a user to adjust an orientation of the laser in at least one of:
        a horizontal direction;
        a vertical direction;
        a depth direction;
        roll;
        pitch; or
        yaw;
    wherein the processor transforms the inputs from the user interface into adjustment instructions for the six-point adjustment system, wherein an adjustment in one of the orientations of the six-point adjustment system is independent of an adjustment in the other orientations.

2. The gear inspection system of claim 1, wherein the six-point adjustment system is a Gough-Stewart platform.

3. The gear inspection system of claim 1, wherein the processor:
    determines whether the reflection of the first signal includes an instability;
    determines a side of the point of interest to which the instability in the reflection of the first signal corresponds;
    determines a horizontal adjustment of the laser away from the side of the point of interest to which the instability in the reflection of the first signal corresponds; and
    sends the horizontal adjustment to the six-point adjustment system.

4. The system of claim 3, wherein the processor further:
    determines a yaw adjustment in a direction toward the point of interest to correspond with the horizontal adjustment of the laser; and
    sends the yaw adjustment to the six-point adjustment system.

5. The system of claim 1, wherein the processor further:
    determines a signal strength of the reflection of the first signal;
    determines a roll adjustment based on the determined signal strength; and
    sends the roll adjustment to the six-point adjustment system.

6. The system of claim 1, wherein the processor further:
    determines whether there are any missing points in the reflection of the first signal;
    determines a pitch adjustment if there are any missing data points in the reflection of the first signal to give a line of sight to the area of interest; and
    sends the pitch adjustment to the six-point adjustment system.

7. The system of claim 1 further comprising a memory for storing the adjustment instructions.

* * * * *